(12) United States Patent
Taniuchi et al.

(10) Patent No.: US 7,328,518 B2
(45) Date of Patent: Feb. 12, 2008

(54) SURFACE ROUGHNESS/CONTOUR SHAPE MEASURING APPARATUS

(75) Inventors: Nobuyuki Taniuchi, Mitaka (JP); Kazuhiro Kubota, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 25 days.

(21) Appl. No.: 11/228,442

(22) Filed: Sep. 15, 2005

(65) Prior Publication Data
US 2006/0080852 A1 Apr. 20, 2006

(30) Foreign Application Priority Data
Oct. 20, 2004 (JP) ............................. 2004-305253

(51) Int. Cl.
*G01B 5/20* (2006.01)
(52) U.S. Cl. ............................. 33/553; 33/551; 33/556; 33/559
(58) Field of Classification Search ................ 33/553, 33/551, 554, 555, 556, 559, 503
See application file for complete search history.

(56) References Cited

U.S. PATENT DOCUMENTS

| | | | | |
|---|---|---|---|---|
| 3,129,918 A | * | 4/1964 | Bradley | 248/287.1 |
| 3,283,586 A | * | 11/1966 | Carow et al. | 73/497 |
| 4,166,323 A | * | 9/1979 | Maag | 33/501.9 |
| 4,377,911 A | * | 3/1983 | Iida et al. | 33/561 |
| 4,765,181 A | | 8/1988 | Numoto et al. | |
| 4,766,674 A | * | 8/1988 | Zanier et al. | 33/503 |
| 4,888,877 A | | 12/1989 | Enderle et al. | |
| 5,621,978 A | * | 4/1997 | Sarauer | 33/503 |
| 5,694,339 A | * | 12/1997 | Ishitoya et al. | 702/167 |
| 6,032,381 A | | 3/2000 | Miller | |
| 6,209,217 B1 | * | 4/2001 | Tsuruta et al. | 33/554 |
| 6,671,973 B2 | * | 1/2004 | Takemura et al. | 33/551 |
| 6,901,677 B2 | * | 6/2005 | Smith et al. | 33/551 |
| 6,944,965 B1 | * | 9/2005 | Watamura | 33/642 |
| 7,036,238 B2 | * | 5/2006 | Kojima et al. | 33/503 |
| 7,107,695 B2 | * | 9/2006 | Paillarse et al. | 33/551 |

FOREIGN PATENT DOCUMENTS

| | | |
|---|---|---|
| DE | 38 23 993 A1 | 1/1990 |
| EP | 0 317 967 A2 | 5/1989 |
| EP | 0 553 819 A1 | 8/1993 |
| EP | 1 463 185 A2 | 9/2004 |
| JP | 2002-107144 | 4/2002 |

OTHER PUBLICATIONS

European Search report dated Dec. 14, 2005 for corresponding EP 05 25 6082 patent application.
Patent Abstract of Japan, Publication No. 2002107144 A, Published on Apr. 10, 2002, in the name of Enomoto.
Partial English translation of DE 380230993 A1, listed above.
European Examination Report dated Dec. 5, 2006 for 05 256 082.8, in the name of Tokyo Seimitsu Co., Ltd.

* cited by examiner

*Primary Examiner*—Diego Gutierrez
*Assistant Examiner*—Amy R. Cohen
(74) *Attorney, Agent, or Firm*—Christie, Parker & Hale, LLP

(57) ABSTRACT

The present invention provides a surface roughness/contour shape measuring apparatus that can move a probe relative to a workpiece within an orthogonal X-Y plane while employing a relatively inexpensive construction. In the surface roughness/contour shape measuring apparatus (1), the probe (6, 7) and a driving unit (4) for driving the probe (6, 7) in one predesignated direction are connected together by a connecting member (8) capable of moving the probe (6, 7) in one predesignated direction relative to the driving unit (4).

5 Claims, 4 Drawing Sheets

SURFACE ROUGHNESS/CONTOUR SHAPE MEASURING APPARATUS

CROSS-REFERENCE TO RELATED APPLICATION

This application claims priority of Japanese Patent Application Number 2004-305253, filed on Oct. 20, 2004.

BACKGROUND OF THE INVENTION

1. Field of the Invention

The present invention relates to a surface roughness/contour shape measuring apparatus and, more particular to a surface roughness/contour shape measuring apparatus for measuring the surface roughness and contour shape of a three-dimensional workpiece along two axis directions without moving the workpiece.

2. Description of the Related Art

A surface roughness/contour shape measuring apparatus measures the surface roughness or contour shape of a workpiece by moving a pickup equipped with a stylus along the surface of the workpiece and by converting the amount of displacement of the stylus into an electrical signal which is read into a computer or the like for processing. FIG. 1 shows the basic configuration of a prior art surface roughness/contour shape measuring apparatus.

The surface roughness/contour shape measuring apparatus 1 is equipped with a probe (pickup) 6 for measuring the surface roughness of the workpiece placed on a table 2, and the pickup 6 is supported on a holder 5 fixed to a driving unit 4.

The pickup 6 has a stylus 7 at its tip, and the amount of displacement of the stylus 7 is converted into a voltage by a differential transducer (not shown) built into the pickup 6. This voltage value is converted by an A/D converter into a digital signal which is input to a data processing apparatus such as a computer (not shown). Thus, measurement data showing the surface roughness of the workpiece is acquired by the data processing apparatus.

As shown in FIG. 1, the driving unit 4 is fitted to a column 3 mounted vertically on the table 2 and, using a motor which is driven under instruction from the data processing apparatus, the driving unit 4 can move the holder 5 in the left/right direction (X direction) which is one predesignated direction parallel to the table surface on which the workpiece is placed; further, the driving unit 4 itself can be moved along the column 3 in the up/down direction (Z direction) perpendicular to the table surface according to the height of the workpiece.

In the prior art surface roughness/contour shape measuring apparatus 1, the direction in which the driving unit 4 can move the pickup 6 along the measurement surface of the workpiece has been limited to the X direction shown in the figure. This is because various standards (for example, JIS standard and ISO standard) defining the measurement of roughness only specify the roughness measured on a straight line.

Accordingly, in such (special) cases as the case of evaluating the surface roughness/contour shape in the X-Y plane, the measurement has been made by mounting on the table a Y-axis driving unit for moving the workpiece in the other one direction (Y direction) than the X direction on the table surface, in order to move the pickup 6 relative to the workpiece along the two in-plane directions (X and Y directions) parallel to the table surface.

Traditionally, such a three-dimensional surface roughness/contour shape measuring apparatus has been used exclusively, for example, for evaluating the luster of a painted surface or the surface property of a film or for measuring the flatness of a liquid crystal coated surface, and an important concern has been to provide a measuring apparatus having a wide measuring range and high versatility.

SUMMARY OF THE INVENTION

However, the need to measure workpieces such as described above using the surface roughness/contour shape measuring apparatus has been gradually decreasing, and instead, the need to measure the shapes of small high-precision parts for micromachine-related applications has been increasing. These applications require submicron or higher precision as well as the management of precision in three dimensions.

However, the prior art surface roughness/contour shape measuring apparatus, in which the movement of the pickup 6 relative to the workpiece along one direction (Y direction) on the measurement surface is accomplished by employing a driving unit for driving the workpiece, has had the following problems.

That is, when the Y-axis workpiece driving unit is used as described above, as there is a limit to its weight-handling capacity, it is not possible to measure a workpiece whose weight exceeds the weight-handling capacity, thus limiting the range of workpiece that can be measured by the surface roughness/contour shape measuring apparatus.

Another problem has been that, a the center of mass affects the distortion of the moving table and the driving of the unit, the amount of deflection changes depending on the center of mass and the mounting position of the workpiece, thus causing an unwanted effect on the measuring accuracy.

Further, to ensure the required weight-handling capacity, a mechanism and a power source that can sufficiently serve the purpose have to be employed for the Y-axis workpiece driving unit, the resulting problem being that not only the size but also the cost of the surface roughness/contour shape measuring apparatus increases.

Furthermore, when the Y-axis workpiece driving unit is mounted on the table as described above, as the column is interposed between the Y-axis workpiece driving unit and the driving unit 4, it is difficult to accurately install the Y-axis workpiece driving unit at right angles to the driving unit 4 because of such effects as temperature changes and vibration.

In view of the above problems, it is an object of the present invention to provide a surface roughness/contour shape measuring apparatus that can move the probe relative to the workpiece within the orthogonal X-Y plane by employing a relatively inexpensive construction.

It is another object of the present invention to provide a surface roughness/contour shape measuring apparatus that can measure the surface shape of the workpiece within the orthogonal X-Z plane or along a sloping surface by employing a relatively inexpensive construction.

To achieve the above objects, in the present invention, the probe of the surface roughness/contour shape measuring apparatus and the driving unit for driving the probe in one predesignated direction are connected together by a connecting member capable of driving the probe in one predesignated direction relative to the driving unit.

More specifically, according to the present invention, there is provided a surface roughness/contour shape measuring apparatus that comprises a probe, which is brought into contact with a surface of a workpiece, and a driving unit, which supports the probe in such a manner as to be movable in one predesignated direction, and that measures a surface shape of the workpiece along the moving direction of the driving unit, wherein a connecting member capable of moving the probe in one predesignated direction relative to the driving unit is provided between the probe and the driving unit.

The connecting member may be fitted between the driving unit and the probe in such a manner as to drive the probe in a direction different from the direction in which the driving unit moves the probe or, alternatively, it may be fitted between the driving unit and the probe in such a manner as to move the probe in the direction that the driving unit drives the probe.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached drawings.

Figure 1:
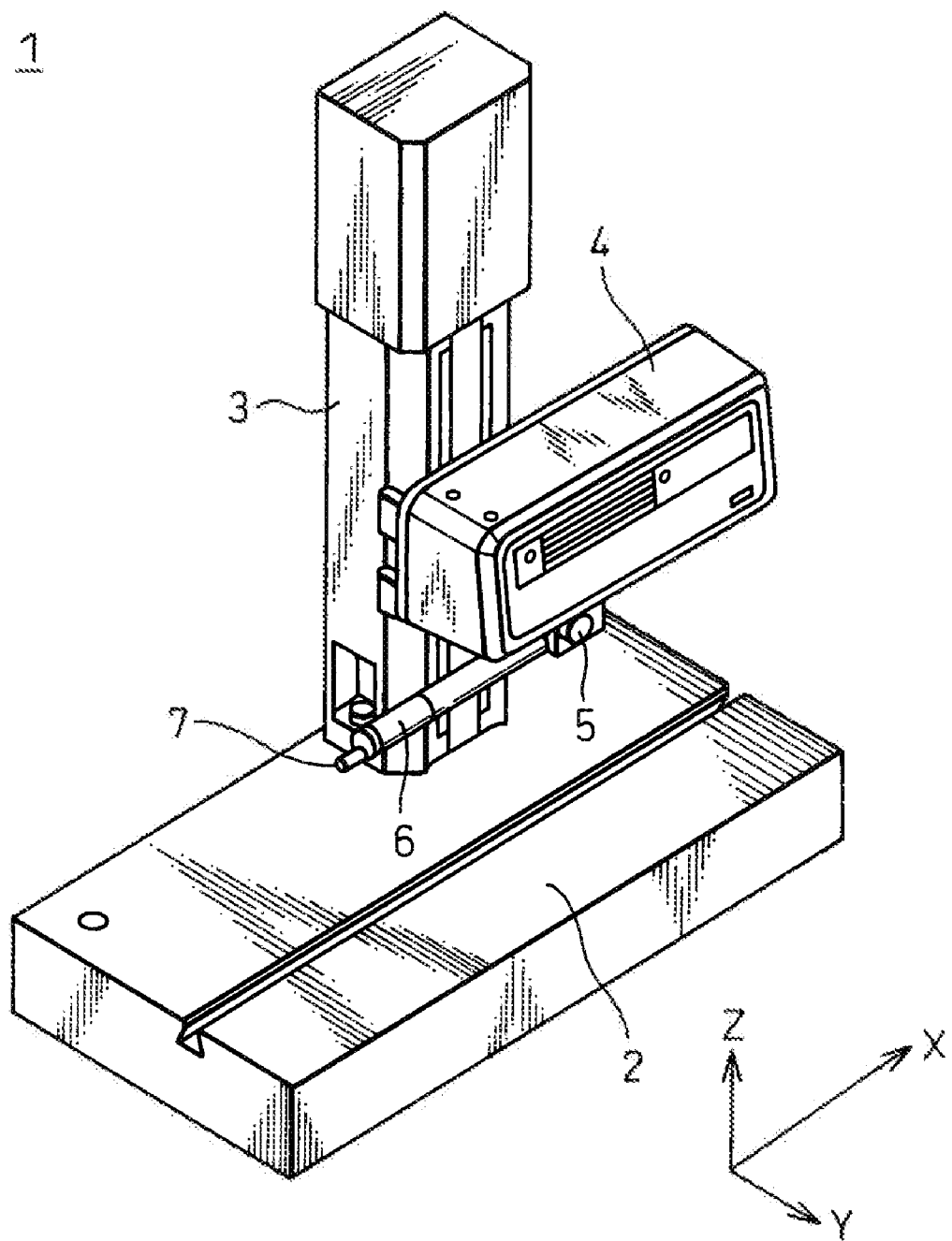
FIG. 1 is a diagram showing the basic configuration of a prior art surface roughness/contour shape measuring apparatus.
Figure 2:
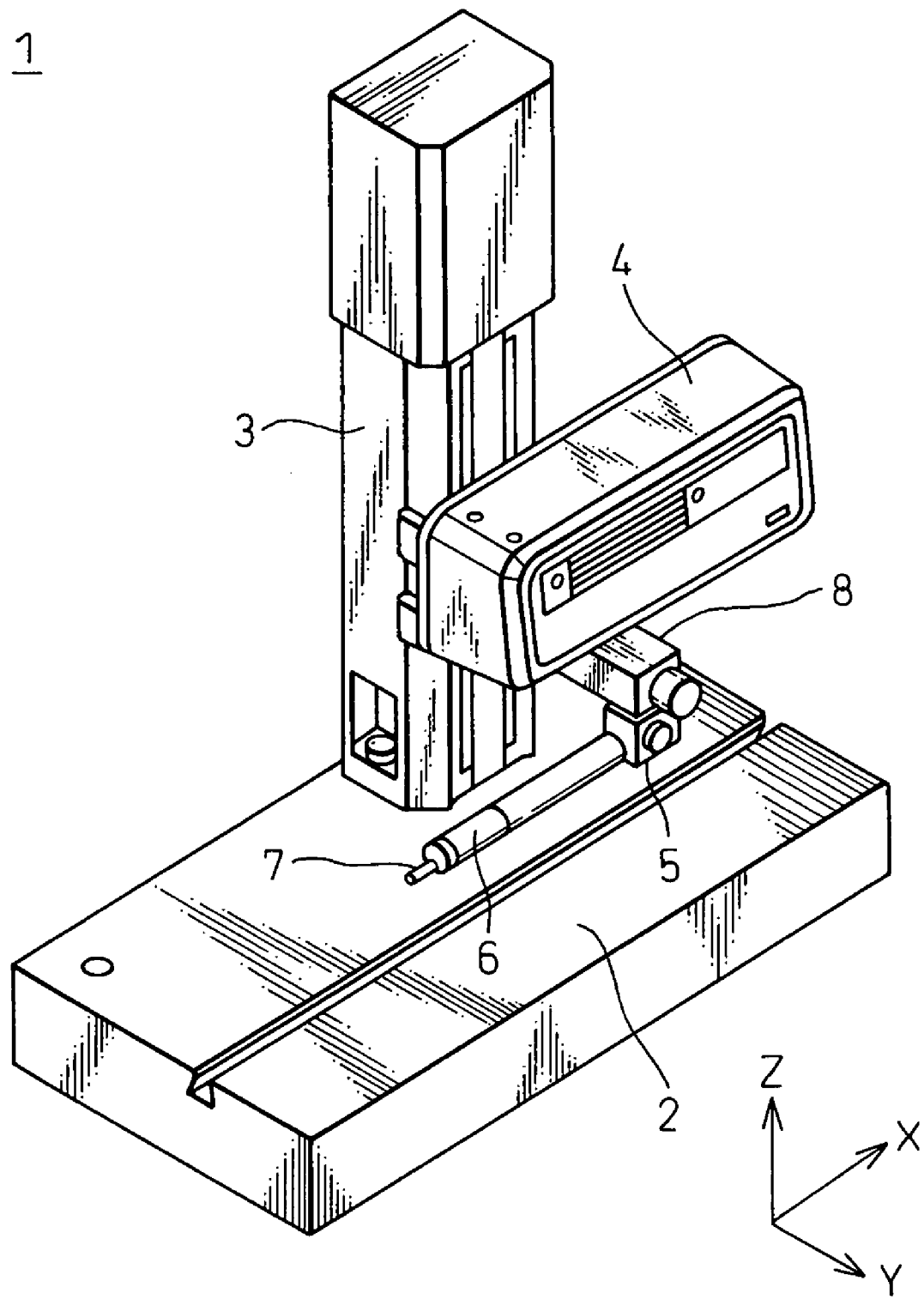
FIG. 2 is a diagram showing the basic configuration of a surface roughness/contour shape measuring apparatus according to an embodiment of the present invention.

FIG. 2 is a diagram showing the basic configuration of a surface roughness/contour shape measuring apparatus according to an embodiment of the present invention. The basic configuration of the surface roughness/contour shape measuring apparatus 1 is similar to the configuration shown in FIG. 1; therefore, the functional parts similar to those in FIG. 1 are designated by the same reference numerals, and the description of such parts will not be repeated here.

As shown, in the surface roughness/contour shape measuring apparatus 1, the holder 5 for supporting the pickup 6 is connected to the driving unit 4 via a connecting member 8.

In the example of FIG. 2, the connecting member 8 is capable of moving the pickup 6 along the Y direction at right angles to the X direction which is one predesignated direction in the X-Y plane parallel to the table surface and in which the pickup 6 is moved by the driving unit 4. An enlarged view of this connecting member 8 is shown in FIG. 3A.

Figure 3A:
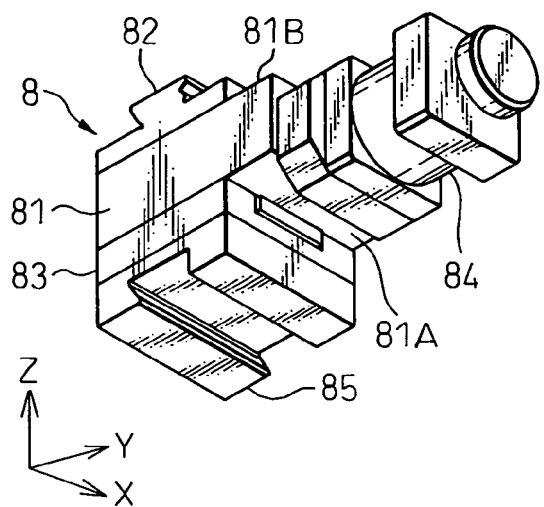
FIGS. 3A and 3B are enlarged perspective views of a connecting member shown in FIG. 2.

As shown in FIG. 3A, the connecting member 8 comprises: a main body 81; a first attachment 82 which is fixed on one side to the main body 81 and is held in engagement on the other side with a driving unit side attachment 41 (see FIG. 3C), thereby holding the main body 81 fixed relative to the driving unit 4; a movable piece 83 which is movable in the Y direction relative to the main body 81; a motor 84 for driving the movable piece 83; and a second attachment 85 which is fixed on one side to the movable piece 83 and engages on the other side with the holder 5 to hold it fixed. The motor 84 is driven under instruction from the data processing apparatus (not shown).

Figure 3B:
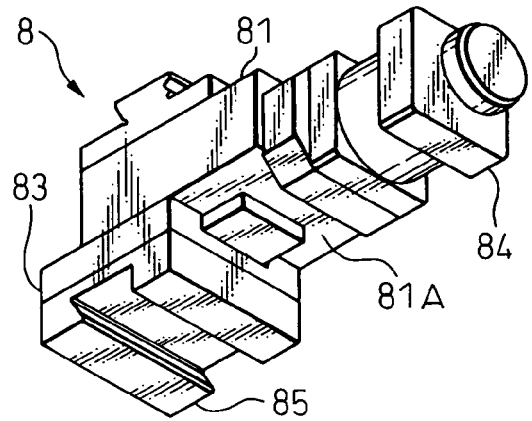

The movable piece 83 is mounted to the main body 81 so as to be slidable in the Y direction along a prescribed surface 81A of the main body 81. FIG. 3B shows the condition in which the movable piece 83 is caused to slide in the Y direction along the prescribed surface 81A of the main body 81.

Figure 3C:
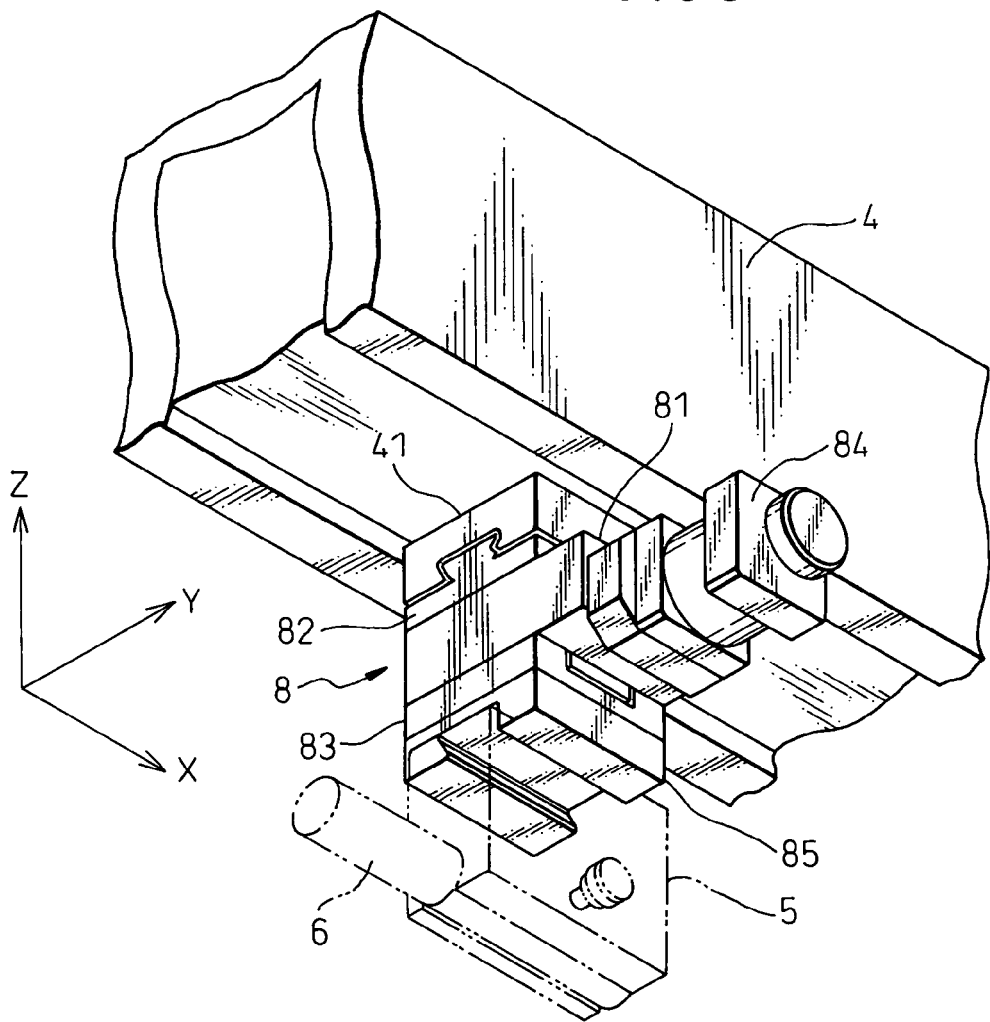
FIG. 3C is a diagram showing an operating condition in which the connecting member is fitted to connect a driving unit to a pickup.

FIG. 3C is a diagram showing an operating condition in which the connecting member 8 is fitted between the driving unit 4 and the holder 5 for holding the pickup 6. As shown, the first attachment 82 of the connecting member 8 is held in engagement with the driving unit side attachment 41 which is driven in the X direction by the driving unit 4. On the other hand, the holder 5 for holding the pickup 6 is held in engagement with the second attachment 85 fixed to the movable piece 83 which is movable in the Y direction relative to the main body 81.

With the above construction, the pickup 6 can be driven in the X and Y directions by the driving unit 4 and the connecting member 8.

This connecting member 8 can be easily retrofitted to any existing surface roughness/contour shape measuring apparatus 1 not equipped with a Y-direction driving mechanism, by using the first attachment 82 and the second attachment 85 respectively adapted to be engageable with the driving unit side attachment 41 and the holder 5 originally provided on the existing surface roughness/contour shape measuring apparatus 1.

Further, when the mounting angle of the first attachment 82 to a surface 81B (XY plane) of the main body 81 is changed by 90°, then the connecting member 8 can be made to engage with the driving unit side attachment 41 so that the pickup 6 is driven by the connecting member 8 in the X direction. As a result, the direction in which the pickup 6 is driven by the connecting member 8 becomes the same as the direction in which the driving unit side attachment 41 is driven by the driving unit 4, and thus the driving range of the pickup 6 can be extended in the X direction.

Furthermore, when the first attachment 82 is mounted on the XZ plane of the main body 81 (that is, the side opposite to the side on which the motor 84 is mounted), the connecting member 8 can be made to engage with the driving unit side attachment 41 so that the pickup 6 is driven by the connecting member 8 in the Z direction. This makes it possible to measure the surface shape of the workpiece in the orthogonal X-Z plane.

In this way, the connecting member 8 can be fitted to the driving unit side attachment 41 or the holder 5 so that the pickup 6 is driven by the connecting member 8 in the direction that the connecting member 8 is driven by the driving unit 4 or in either one of the two directions orthogonal to it; furthermore, when the angle at which the first attachment 81 is fitted to the mounting surface of the main body 81 is made different from (nonparallel to) the angle at which it is fitted to the mounting surface of the driving unit side attachment 41, then it becomes possible to mount the connecting member 8 so that the pickup 6 can be driven by the connecting member 8 in a direction tilted (at an angle) with respect to the X direction.

Further, an angle adjusting mechanism such as a universal head may be provided to the driving unit side attachment 41 or the first attachment 82 in order to adjust the relative angle between the direction in which the pickup 6 is driven by the connecting member 8 and the direction in which the connecting member 8 is driven by the driving unit 4.

When it becomes possible to drive the pickup 6 by the connecting member 8 in a direction tilted at a desired angle, as described above, the following effect is obtained.

That is, when measuring the surface roughness of a workpiece such as a machining mark on a cutting tool, for example, it is a general rule to make the measurement by moving the probe at right angles to the machining direction of the workpiece. If the probe is to be moved in such a measuring direction by using, for example, a conventional XY axis moving mechanism, the probe moves in jagged fashion depending on the XY resolution of the XY axis moving mechanism, and this causes measurement errors. However, according to the connecting member 8 of the present invention, as the moving direction of the connecting member 8 can be set as desired in accordance with the machining direction, it becomes possible to prevent such measurement errors by making the measurement, for example, by setting the moving direction of the connecting member 8, so as to match the machining mark on the cutting tool. Further, it also becomes possible to efficiently measure the measurement surface if it is tilted in an arbitrary direction.

Figure 4:
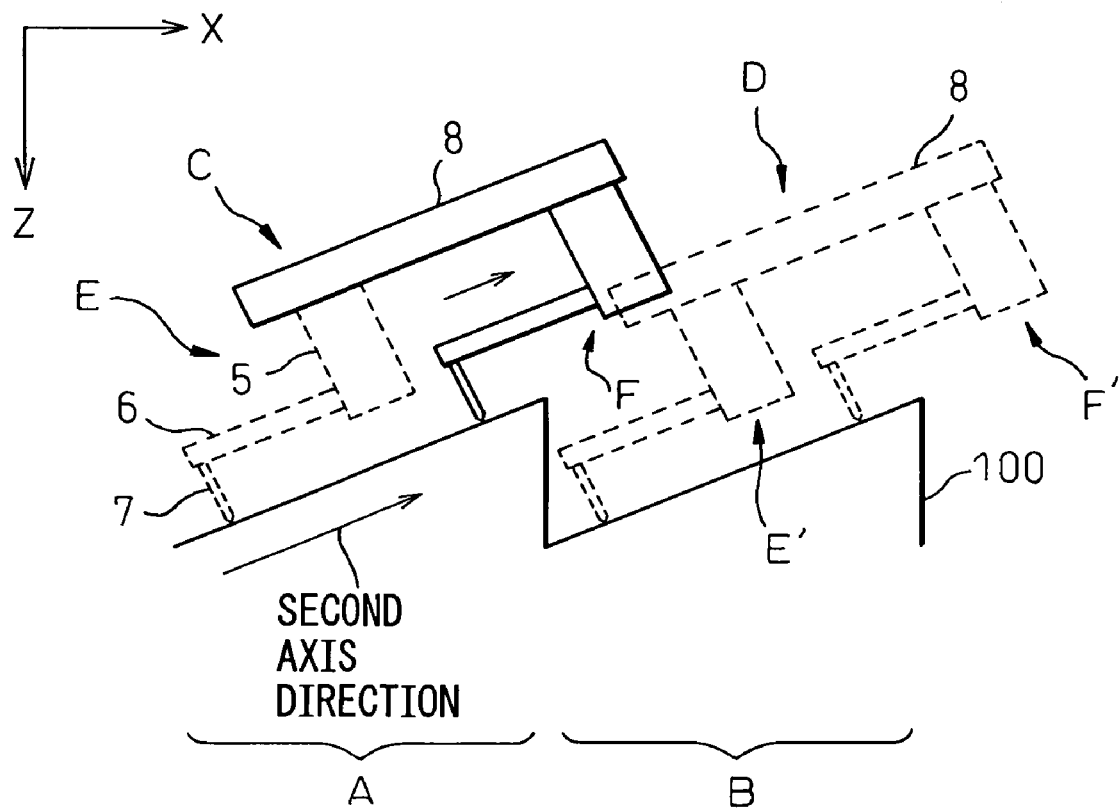
FIG. 4 is a diagram for explaining how a sawtooth face is measured using the surface roughness/contour shape measuring apparatus shown in FIG. 2.

When measuring a sawtooth face such as shown in FIG. 4, the connecting member 8 is fitted so that the pickup 6 is driven by the connecting member 8 in a second axis direction along the sawtooth face within the XZ plane.

Then, as shown in the figure, when measuring a tooth face portion A, the connecting member 8 moves the pickup 6 from position E to position F while the connecting member 8 is held fixed at position C by the driving unit 4. When the measurement of the tooth face portion A is completed, the driving unit 4 moves the connecting member 8 to position D, while on the other hand, the connecting member 8 moves the pickup 6 back to position E', and then moves the pickup 6 from position E' to position F' to measure a tooth face portion B, in the same manner as the measurement of the tool face portion A. By repeating this operation, the sawtooth face can be measured with high resolution and in a continuous fashion.

As described above, when the connecting member according to the present invention is attached, the surface roughness/contour shape measuring apparatus 1 can easily measure the surface roughness/contour shape of workpiece along the XY plane parallel to the table surface.

Further, when, for example, a cylindrically shaped workpiece is laid on its side on the table 2, and the coordinates and height of each point on the cylindrical surface of the cylindrically shaped workpiece are measured by moving the pickup in the X and Y directions over the cylindrical surface of the cylindrically shaped workpiece, then the coordinates and height of the apex of the cylindrical surface at each position in the extending direction of the cylindrically shaped workpiece can be easily determined.

Furthermore, by selecting two apexes of the cylindrical surface of the cylindrically shaped workpiece laid in an arbitrary direction, and by obtaining the lying directions of the apexes of the cylindrical surface in advance, it becomes possible to measure the parallelism between the sides of the cylindrically shaped workpiece. In this case, to facilitate the measurement by aligning the extending directions of the cylindrically shaped workpiece in the X and Y directions, the cylindrically shaped workpiece to be placed on its side on the table 2 may be placed on a rotating table for rotating the workpiece about the Z axis, and the measurement may be made in this condition.

When the driving unit and the pickup are connected together by using the connecting member of the present invention described above, the pickup can be moved relative to the workpiece within the measurement plane without moving the workpiece.

This makes it possible to measure the surface shape of the workpiece within the measurement plane without being limited by the maximum weight handling capacity of the workpiece driving unit such as a workpiece moving table. Furthermore, since the probe to be driven by the connecting member is a relatively light-weight component, a small mechanism capable of high precision can be achieved simply and at low cost.

Further, neither the center of mass nor the mounting position of the workpiece affects the measuring accuracy.

By mounting the connecting member so as to drive the probe in a direction different from the direction in which the driving unit moves the probe, the measurement can be made not only in the orthogonal XY plane and the orthogonal XZ plane but also along various sloping surfaces outside these orthogonal planes. Here, the X direction refers to one predesignated direction parallel to the mounting surface on which the workpiece is mounted, that is, the direction in which the probe is driven by the driving unit, and the Y direction refers to the another direction parallel to the mounting surface but different from the X direction, while the Z direction refers to the direction perpendicular to the mounting surface.

Further, by mounting the connecting member so as to drive the probe in the direction that the driving unit moves the probe, the measurable range can be extended in the direction (X direction) along which the driving unit moves the probe.

The invention also makes it possible to measure a sawtooth face in a continuous fashion and with high resolution.

The present invention can be extensively applied to measuring apparatuses that measure the surface shape of workpiece by moving a probe such as a stylus along the surface of the workpiece.

While the invention has been described with reference to specific embodiments chosen for purpose of illustration, it should be apparent that numerous modifications could be made thereto by those skilled in the art without departing from the basic concept and scope of the invention.

What is claimed is:

1. A surface roughness/contour shape measuring apparatus composing:
   a probe, which is brought into contact with a surface of a workpiece;
   a driving unit configured to move said probe in a predesignated direction for measuring a surface shape of said workpiece along a moving direction of said driving unit, said driving unit having a driving unit attachment; and
   a connecting member configured to move said probe in a direction relative to said driving unit and provided between said probe and said driving unit, wherein said connecting member includes a holder provided between said probe and said driving unit to hold said probe, a first attachment provided on a first side of the connecting member and slidably engageable with the driving unit attachment, a slidably movable piece provided on an opposite side to the first side of the first attachment, and a second attachment provided on the movable piece and slidably engageable with the holder.

2. A surface roughness/contour shape measuring apparatus as claimed in claim 1, wherein said movable piece is configured to drive said probe in a direction different from the direction in which said driving unit moves said probe.

3. A surface roughness/contour shape measuring apparatus as claimed in claim 1, wherein said movable piece is configured to drive said probe in a same direction that said driving unit moves said probe.

4. A connecting member to be attached to a surface roughness/contour shape measuring apparatus that includes a probe, which is brought into contact with a surface of a workpiece, and a driving unit, which supports said probe in such a manner as to be movable in a predesignated direction for measuring a surface shape of said workpiece along the moving direction of said driving unit said driving unit having a driving unit attachment, said connecting member comprising:

a holder provided between said probe and said driving unit to hold said probe;

a first attachment slidably engageable with the driving unit attachment; and a second attachment slidably engageable with the holder, wherein said connecting member is configurable to move said probe in a plurality of different directions relative to said driving unit.

5. A connecting member as claimed in claim 4, further comprising a slidably movable piece provided between the first attachment and the second attachment.

* * * * *

UNITED STATES PATENT AND TRADEMARK OFFICE
CERTIFICATE OF CORRECTION

PATENT NO. : 7,328,518 B2
APPLICATION NO. : 11/228442
DATED : February 12, 2008
INVENTOR(S) : Nobuyuki Taniuchi It is certified that error appears in the above-identified patent and that said Letters Patent is hereby corrected as shown below:

In the Claims

Column 6, line 51, Claim 1    Delete "composing",
                              Insert --comprising--

Signed and Sealed this

Fourth Day of November, 2008

JON W. DUDAS
*Director of the United States Patent and Trademark Office*